Figure 1:
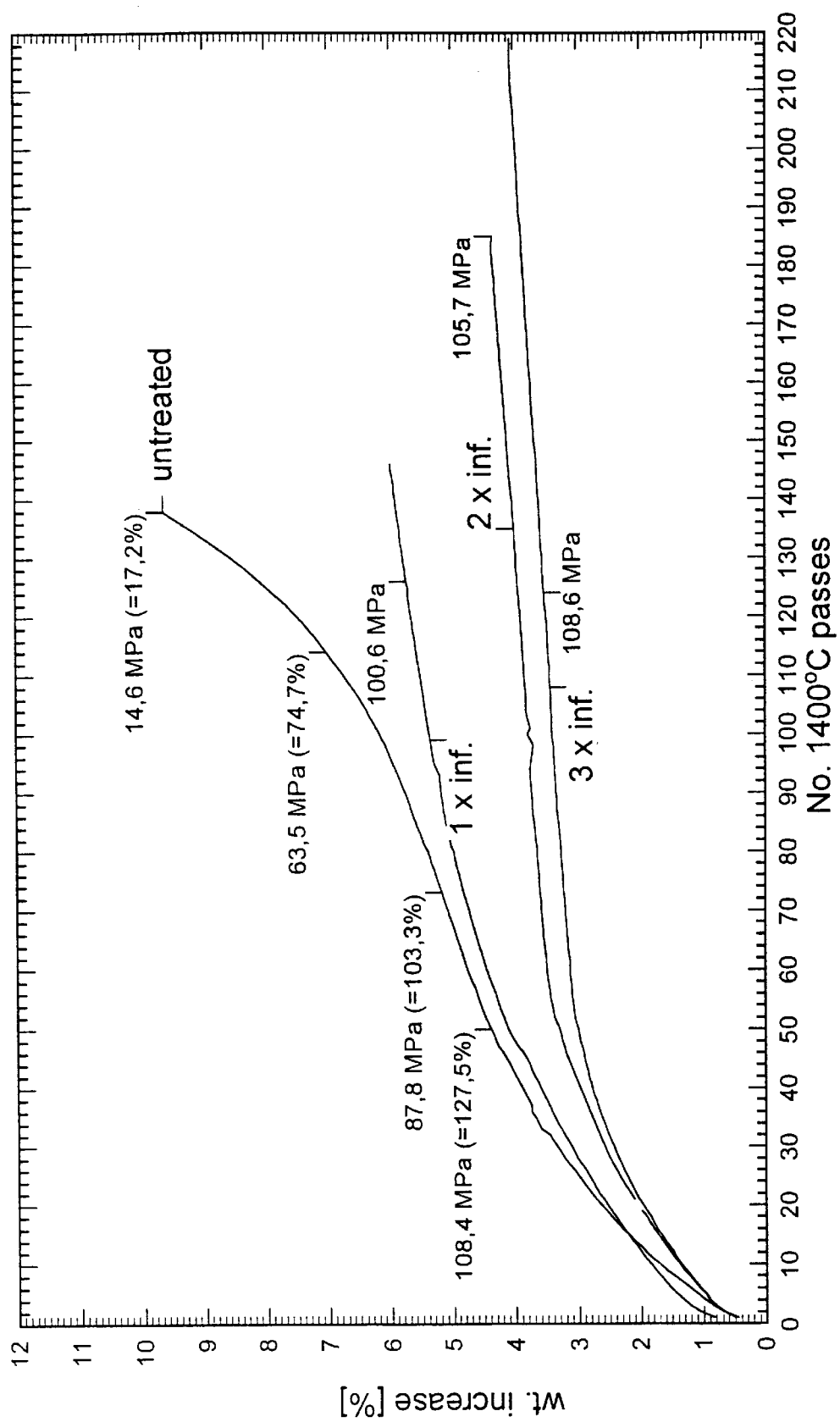

United States Patent
Sonntag

Patent Number: 6,143,239
Date of Patent: Nov. 7, 2000

[54] METHOD FOR MANUFACTURING AN ANTI-OXIDATION SYSTEM FOR POROUS CERAMICS ON THE BASIS OF SIC AND $SI_3N_4$

[75] Inventor: Andreas Sonntag, Wasserburg, Germany

[73] Assignee: W. Haldenwanger Technische Keramik GmbH & Co., KG, Berlin, Germany

[21] Appl. No.: 08/919,915

[22] Filed: Aug. 28, 1997

[30] Foreign Application Priority Data

Aug. 28, 1996 [DE] Germany .................. 196 34 855

[51] Int. Cl.[7] .................................................. C04B 36/624
[52] U.S. Cl. .................. 264/621; 264/642; 264/643; 427/226; 427/314; 427/375; 427/376.1; 427/376.2; 427/372.2
[58] Field of Search .................................. 264/642, 621, 264/643; 427/314, 375, 376.1, 376.2, 372.2, 226

[56] References Cited

U.S. PATENT DOCUMENTS 5,120,576 6/1992 Goldsmith .................. 427/245
5,268,199 12/1993 Brown, Jr. .................. 427/226

OTHER PUBLICATIONS

Abstract of JP 62123949 Nov. 25, 1998.
WPIDS Copyright 1997 Derwent Information Ltd.
Effect of Siloxane Infiltration of Green Samples on Properties of RBSN, In European Ceramic Society 10, 1992, pp. 205–211.
Sol–Gel Preparation of Ceramics and Glasses in Met. Mater, 14,1988, pp. 748–751.
Low–Shrinkage refractories by An Infiltration Technique, In European Ceramic Society, 14, 1994.

*Primary Examiner*—James Derrington
*Attorney, Agent, or Firm*—Young & Basile, P.C.

[57] ABSTRACT

The invention relates to a method of manufacturing an anti-oxidation system for porous ceramics on the basis of SiC or $Si_3N_4$. By means of infiltration into the pore inner spaces of a sol containing at least one metal component, conversion of the sol to a gel (sol-gel process) and a subsequent high-temperature treatment, it is possible successfully to provide a crystalline anti-oxidation layer, which is resistant to temperatures of up to at least 1650° C. even under cyclic temperature stresses, and reveals a heat expansion behavior adapted to the SiC or $Si_3N_4$ over the entire temperature range used.

26 Claims, 5 Drawing Sheets

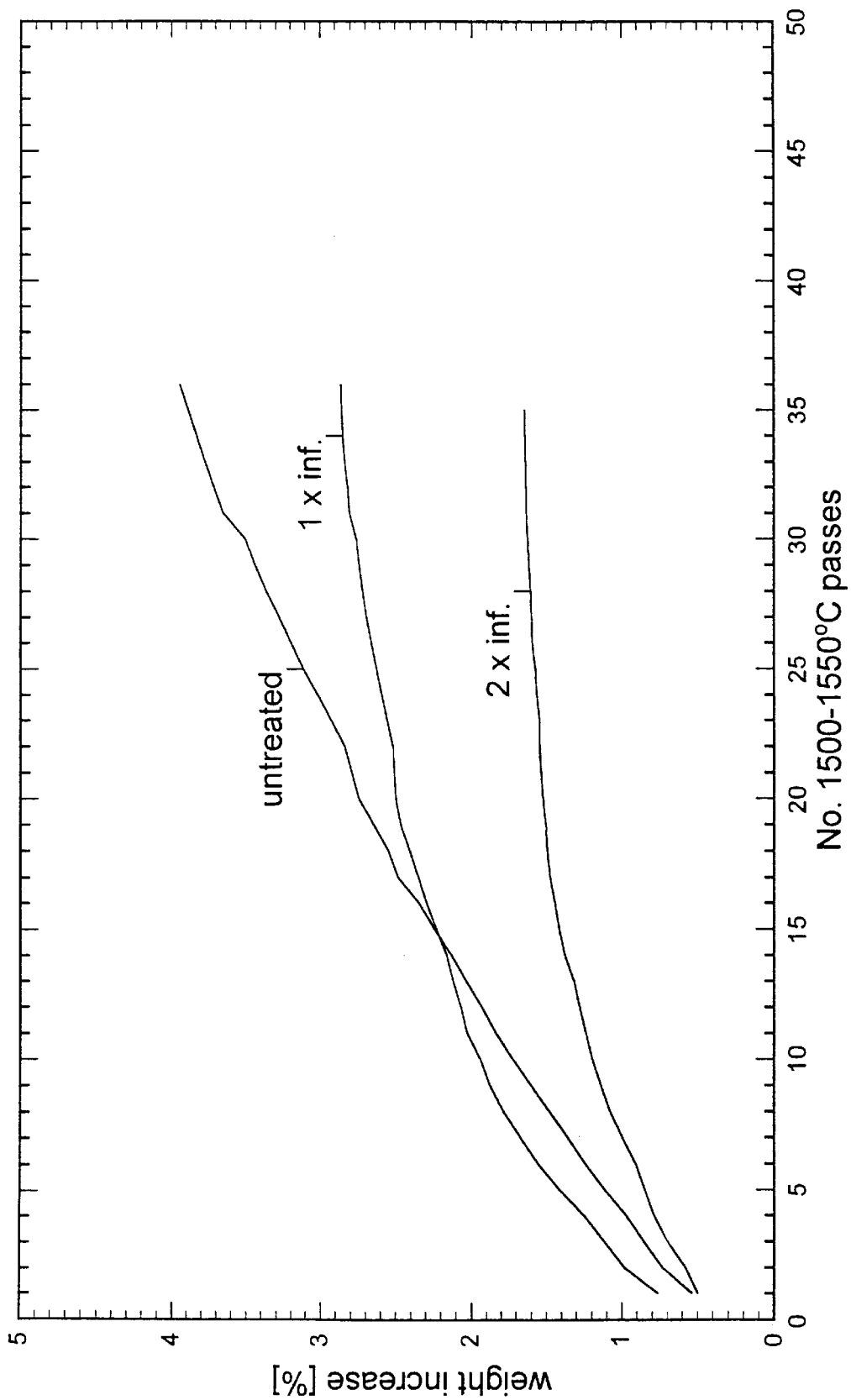

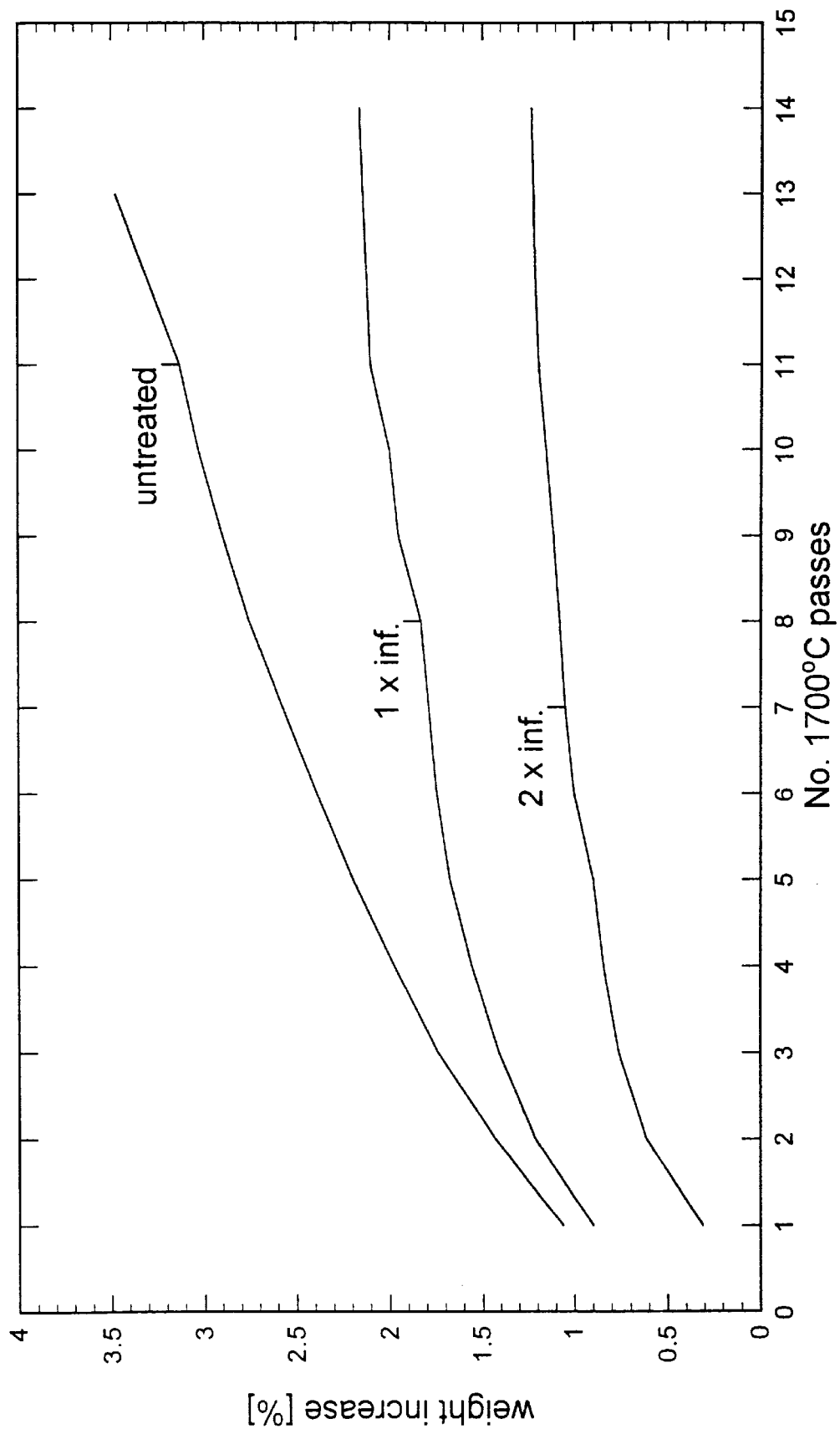

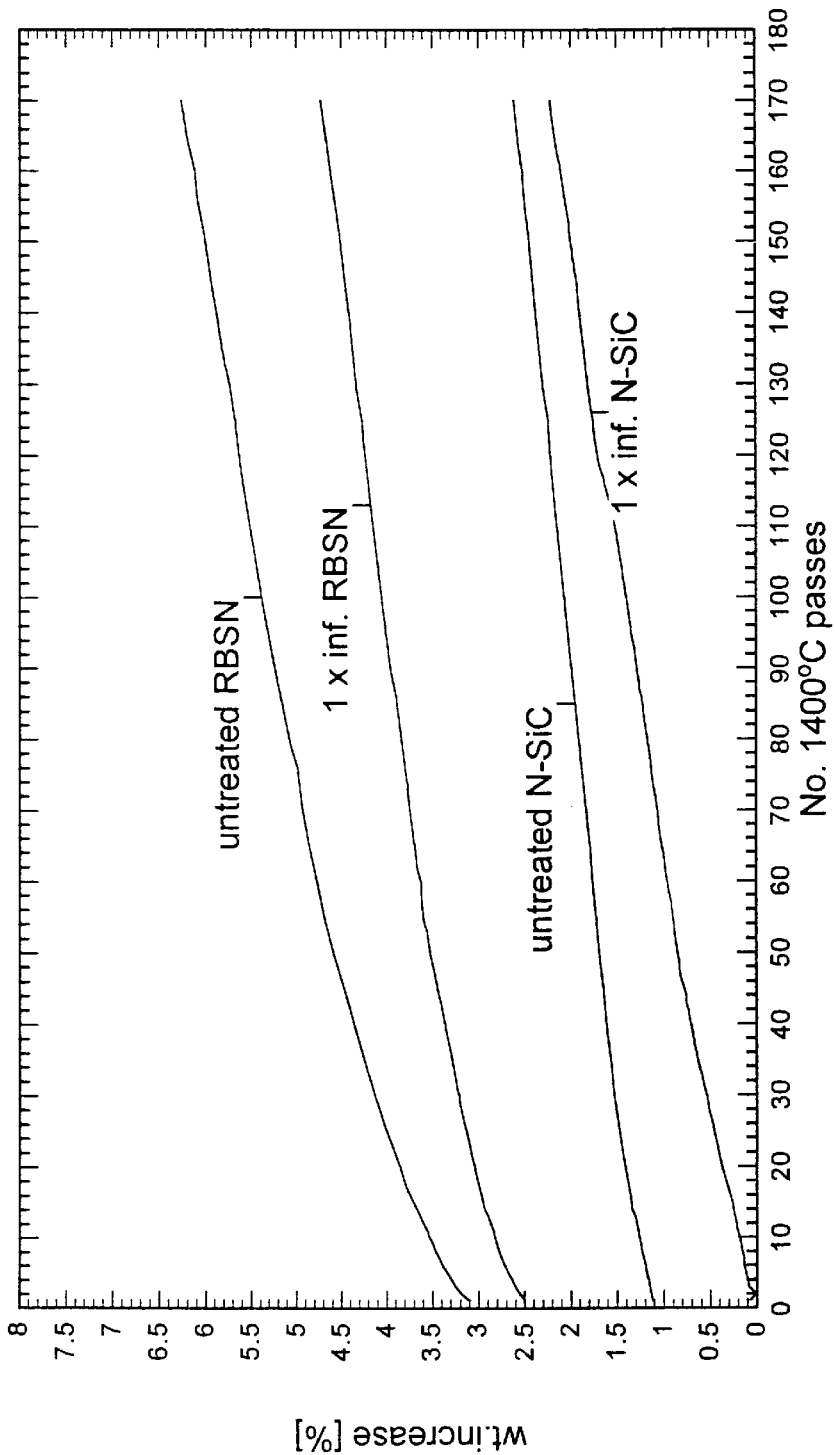
FIGURE 7: cyclical oxidation test of nitride bonded SiC and reactionbonded $Si_3N_4$
comparison of samples, untreated and infiltrated with AlOOH-sol, T = 1400-1420 °C

METHOD FOR MANUFACTURING AN ANTI-OXIDATION SYSTEM FOR POROUS CERAMICS ON THE BASIS OF SIC AND $SI_3N_4$

The invention relates to an infiltration method for manufacturing an anti-oxidation system for porous ceramics on the basis of SiC and $Si_3N_4$.

Ceramics on the basis of silicon carbide (SiC) and silicon nitride ($Si_3N_4$) are characterised by their resistance to high temperatures, an excellent resistance to temperature fluctuation, chemical stability and high strength. The outstanding chemical and physical resistances of these non-oxide ceramics are maintained even at extremely high temperatures, i.e. the ceramics are dimensionally stable even under high mechanical stress at high temperatures.

Therefore ceramics on the basis of SiC and $Si_3N_4$ find their use particularly in the field of high-temperature technology as so-called kiln furniture in the form of heavy-duty beams, rollers, plates, supports and complete combustion hearth constructions, etc.

There shall be named here as SiC ceramics silicon-infiltrated silicon carbide (SiSic, dense ceramics without porosity) and the recrystallised SiC (R—SiC, porous ceramics with an open porosity of approximately 10 to 15%), and the nitride-bound or also oxinitride bound SiC (N—SiC, porous ceramics with an open porosity of approximately 10 to 15%). Due to the melting point of the metallic Si phase, SiSic is permanently usable up to a maximum temperature of 1350° C. Therefore, for temperatures above 1400° C., R—SiC or N—SiC are preferably used. The applicable threshold temperature of these SiC ceramics in oxygen-containing atmospheres lies, for R—SiC at about 1650° C., and in inert atmospheres even above 2000° C. N—SiC can be used in oxidising atmospheres up to about 1450° C. Due to manufacturing considerations, both ceramics are open-pored materials. A decisive factor for the maximum period of use on the maximum temperature used for these ceramics is the oxidation of the SiC surface taking place in oxygen-containing atmospheres which, due to the open porosity, relate to the entire cross-section of the ceramic component:

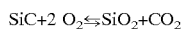

$SiC + 2\ O_2 \rightleftharpoons SiO_2 + CO_2$

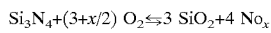

$Si_3N_4 + (3+x/2)\ O_2 \rightleftharpoons 3\ SiO_2 + 4\ No_x$

By means of the oxidation, the SiC and the $Si_3N_4$ surface is covered with an $SiO_2$ layer, which is present predominantly in a crystalline form as cristobalite. In the case of an isothermic oxidation there is present on the SiC and $Si_3N_4$ surface a strongly-adhering and closed $SiO_2$ protective layer, which slows further oxidation of the ceramic. The further progress of oxidation is determined by inter-diffusion process of the $O_2$ and $CO_2/CO$ or $NO_x$ within the $SiO_2$ layer.

In the case of cyclic temperature stress and thus cyclic oxidation, the various heat expansion behaviours of SiC or $Si_3N_4$ and $SiO_2$ are noticeable, in that the $SiO_2$ layer becomes cracked and thus the fresh SiC surface is made accessible to a renewed unhindered oxidation attack when used at high temperature. Deceleration of the oxidation by formation of a closed protective layer, as becomes apparent in the use of isothermic high temperature, does not exist in cyclic high-temperature operation. Consequently, the progress of oxidation in this case is, dissimilarly, higher.

Particularly upon cyclic temperature stress, oxidation of the SiC/$Si_3N_4$ leads to damage to the SiC/$Si_3N_4$ matrix. This becomes apparent in R—SiC in microscopically recognisable connecting cracks, which clearly emerge from oxidised pore surfaces and lead as a direct consequence to a clear drop in strength of the entire component. It is certain that the progress of oxidisation determines the life expectancy of the R—SiC components when used at high temperatures. In the case of N—SiC or reaction-bound $Si_3N_4$ (RBSN), a continued oxidation becomes apparent by swelling of the components and a crude reduction in strength.

Various attempts have been made to decelerate the oxidation of porous SiC/$Si_3N_4$ materials. There is known from DE 43 09 267 the impregnation of ceramic moulded components with glaze-forming salt solutions and from J. Schlichting et al., "$GeO_2$—$SiO_2$ glasses from gels to increase the oxidation resistance of porous silicon containing ceramics", Journal of Non-Crystalline Solids, 48, 1982, 184–195 with glaze-forming gels. A common factor in both techniques is that glass-forming oxide combinations are infiltrated into the porous SiC. After a subsequent thermal treatment the solutions dry and cover the internal pore space with the corresponding oxide combinations which, during a further temperature treatment, convert into an amorphous, i.e. non-crystalline condition and cover the SiC surfaces. In this way the life duration of the moulded parts may typically be increased by 50%. A characterising factor here is that by means of the introduction of the glass-building oxides into the pore spaces of the SiC, clearly the formation of cristobalite on the SiC surface has been suppressed to the greatest extent.

A disadvantage in these methods is however that the heat expansion coefficients of the respectively selected glass-forming oxide combinations with about 7 to $9\times10^{-6}$ $K^{-1}$ (RT-$T_g$) lie clearly above the heat expansion coefficients of SiC with about $4.5\times10^{-6}$ $K^{-1}$ (RT-1000° C.). Here also temperature cycles lead to local tensions between the SiC and the glass coating formed, which in turn causes breakages in the protective layer and thus exposure of fresh SiC surface. Moreover, the typical softening of the glass phase above the glass transformation temperature $T_g$ leads to a viscosity of the glass melt which reduces as the temperature increases. The reduction in viscosity of the glass melt leads directly to an increased interdiffusion of the oxidation-determining components $O_2$ and $CO/CO_2$. This becomes apparent at temperatures of e.g. above 1500° C. in the formation of glass foam on the SiC surfaces, which is to be ascribed to the increased oxidation speed and thus glass formation.

A further possible anti-oxidation system for R—SiC can be achieved by coating of R—SiC component surfaces by means of vacuum plasma injection technique, which leads to a maximum increase in life duration of coated components in comparison to uncoated components of a maximum 30% (H. Rump et al., "Plasmabeschichtungen -Oxidationsschutz für R—SiC Brennhilfsmittel", Keramische Zeitschrift, 47, No. 4, 1995, 284–286). In this case dense oxide-ceramic protective layers of $Al_2O_3$ and/or $ZrO_2$ are injected onto the component surfaces, which are intended to prevent the inward diffusion or inward flow of gaseous oxygen. Dense oxide layers however can in this case only be achieved by means of the relatively expensive vacuum plasma injection technique; the entire inner pore space cannot be coated. A further disadvantage is that hollow bodies such as rollers or beams can only be coated from the exterior and thus the oxygen attack can progress unhindered through the inner spaces.

The object underlying the invention is to provide a method of manufacturing an anti-oxidation system for porous ceramics on the basis of SiC or $Si_3N_4$, which is permanently resistant for temperatures of at least 1650° C.

even under cyclic temperature stresses, and shows a heat expansion behaviour adapted to the ceramic raw material over the entire usable temperature range.

The present invention addresses and solves the above-mentioned problems and meets the enumerated object(s) and advantages, as well as others not enumerated.

According to the present invention, a sol containing at least one metal component is infiltrated into the open pore inner spaces of the ceramic on the basis of SiC or $Si_3N_4$, a gel is formed from this sol (sol-gel process) and the ceramic thus prepared is subjected to a high-temperature treatment.

The anti-oxidation system according to the invention is particularly suitable for ceramics of recrystallised SiC (R—SiC) of nitride-bound or oxinitride-bound SiC (N—SiC) or of reaction-bound $Si_3N_4$ (RBSN), for example in the form of moulded bodies such as plates, pipes, rods, brackets, etc.

More advantageously, the sol infiltration/gel formation cycle is repeated several times before the high-temperature treatment, in order in this way to be able to introduce a larger quantity of the metal components into the pore inner spaces.

The high-temperature treatment is preferably carried out in an oxidising atmosphere at temperatures between 1000 and 1700° C.

During high-temperature treatment, as a result of a solid reaction between the gel phase and the SiC or $Si_3N_4$ surfaces, a crystalline or part-crystalline anti-oxidation layer is formed, which reveals a heat expansion behaviour adapted over the entire usable temperature range to the SiC or $Si_3N_4$, and thus suppresses local thermally induced tensions in cyclic temperature operation. By means of the purely crystalline solid protective layer, the interdiffusion processes of the $O_2$ and $CO/CO_2$ or $NO_x$ are reduced, as these take place dissimilarly in a crystalline protective layer in a slower manner than in a liquid molten amorphous glass phase. Consequently, the crystalline protective layer in high-temperature use leads to a comparatively slower progress of oxidation. The oxidic protective layer systems according to the invention surprisingly ensure a permanent oxidation protection for open-pored R—SiC, N—Si—C and RBSN, even in cyclic high-temperature operation.

During high-temperature use, the $SiO_2$ arising on the SiC or SiC or $Si_3N_4$ surface in the form of an in-situ solid reaction, is converted to a new refractory solid phase. According to the invention, the $SiO_2$ layer inevitably forming on the SiC or $Si_3N_4$ surface in the first high-temperature use under the influence of $O_2$, is directly combined at the point of origin with a further oxide component and transferred into a crystalline solid phase. The oxide component required for this is introduced before high-temperature use by a liquid phase produced by means of sol-gel technology for example via a vacuum or pressure infiltration method into the pore inner space of the open-pore SiC material. The theoretical procedure of sol-gel technology can be found in general prior art.

The sols used in this case can be produced (A) by hydrolysis of alkoxides:

$$M\text{-}(OR)_x + y\ H_2O \leftrightarrows M\text{-}(OH)_y + x\ R\text{-}OH \tag{A}$$

A further method of manufacturing a sol can be undertaken by dispersing metal hydroxide powders and/or partly hydrated metal oxide powders in water (B). Thus a metal component already produced by means of the alkoxide process described under (A) is dried and as required dispersed in water by adding a suitable electrolyte in water in the form of micro-fine particles or colloids.

$$M\sim(\ )H)_2 + H_2O \xrightarrow{\text{electrolyte}} M\text{-}(OH)\ \text{disp.} \tag{B}$$

Preferably, the metal component is present in the sol at a concentration between 3 and 30%. AlOOH, $Zr(OH)_4$ or mixtures of these components are preferably used as suitable metal components.

The sols used for infiltration of the open-pored SiC or $Si_3N_4$ ceramics are advantageously so set that their viscosity leads to total filling of the pore spaces and the sol is retained in this pore space after infiltration. The sol preferably has a viscosity between 10 and 300 mPas at a shear gradient of 500 l/s.

The sols can then pass through a so-called polycondensation to form a gel, which is directly connected with a continuous rise in the viscosity of the sol. The viscosity and the viscosity increase, i.e. the kinetics of the polycondensation of the sol, are influenced by the concentration of the metal components, the temperature and the type and method of added electrolyte. For example, polycondensation can be effected at temperatures between 30 and 110° C. for a period between 30 minutes and 5 hours.

In this case, surprisingly a substantial advantage of sol-gel technology has become apparent in comparison e.g. to salt solutions, which reveal a constant and comparatively low viscosity. By means of the sol-gel technology in comparison to salt solutions, higher concentrations of the oxide components can also be introduced into the liquid phase. The concentration of the oxide component introduced into the pore inner space by sol-gel technology is therefore advantageously higher in comparison to analogous salt solutions. In this way it can be ensured that after subsequent drying of the sol and dehydration of the chemically bound water of the hydroxide, a sufficient quantity of the oxide component is present for the in-situ reaction.

In particular, the systems $Al_2O_3$ and $ZrO_2$ are suitable according to the invention for the oxidation protective layer components for SiC and $Si_3N_4$ remaining after gelation in the pores.

These oxides form with the $SiO_2$ resulting from the superficial oxidation of the SiC or $Si_3N_4$, via an in-situ high-temperature reaction, the following crystalline solid phases:

$$2\ Sic_2 + 3\ Al_2)_3 \leftrightarrows 3\ Al_2O_3 . s\ SiO_2\ \text{(mullite)} \tag{1}$$

$$2\ SiO_2 + ZrO_2 \leftrightarrows ZrsiO_4\ \text{(zircon)} \tag{2}$$

The eutecticsof the systems with the lowest melting points with $T_{eut.,\ min} = 1595°$ C. for $Sio_2 + Al_2O_3$ and $T_{eut.,\ min} = 1675°$ C. for $Sio_2 + ZrO_2$ are extraordinarily high and thus lead, depending on the maximum temperature used, to the desired high-temperature-resistant crystalline anti-oxidation layer.

For a cyclic high-temperature use it is now of decisive importance to minimise the local, thermally induced boundary layer tensions between anti-oxidation layer and the SiC or $Si_3N_4$ basic body or an $Si_3N_4$ bond matrix.

The reaction products of the anti-oxidation layers now advantageously lead to crystal systems which, with approximately $4.0–5.5 \times 10^{-6}\ K^{-1}$ (3 $Al_2O_3$.2 $SiO_2$, $ZrSiO_4$), have a heat expansion coefficient (RT-1000° C.) similar to SiC ($4.5–4.8 \times 10^{-6}\ K^{-1}$) or $Si_3N_4$ ($3.2–3.6 \times 10^{-6}\ K^{-1}$).

The adapted heat expansion behaviours of the oxide systems consequently lead to formation of an extensively crack-free closed and crystalline protective layer on the SiC or $Si_3N_4$ surface even during cyclic high-temperature use of the ceramics.

Surprisingly, by means of the sol-gel infiltration technique described, a sufficient quantity of the above named in-situ formed crystal phases can be formed in the pore inner space of the R—SiC, N—SiC and RBSN ceramics, so that these reveal the required high-temperature oxidation protection in cyclic high-temperature use with astonishing distinction.

Figure 2:
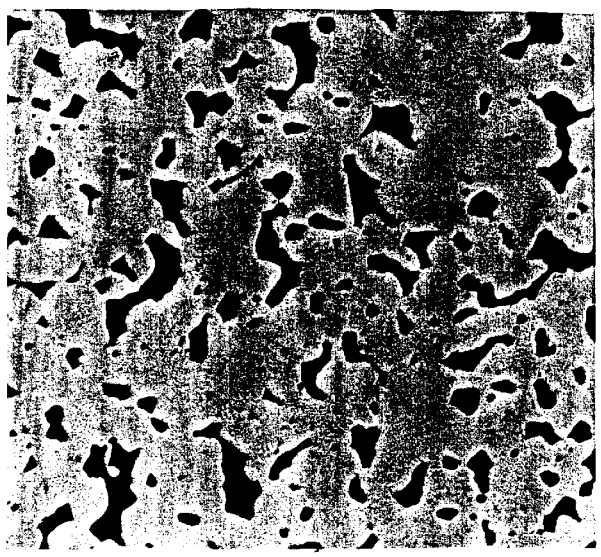
Figure 3:
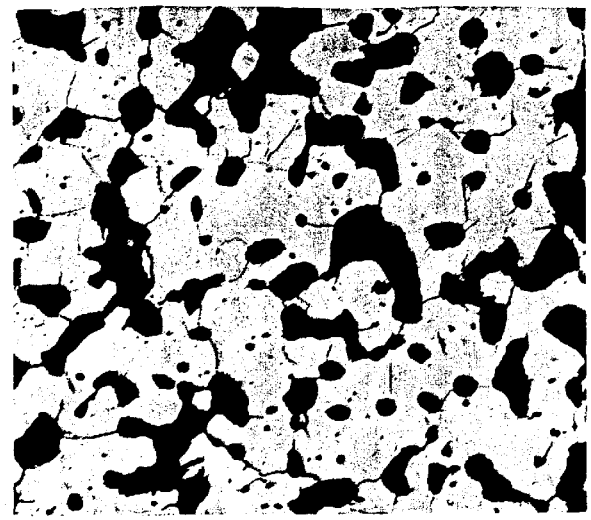
Figure 4:
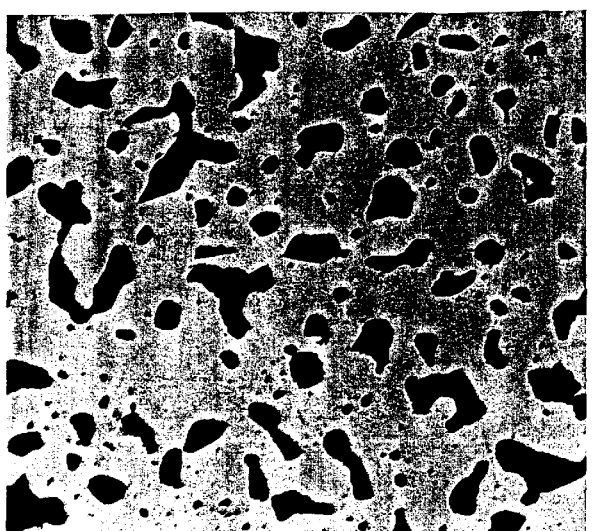

The invention will be described in more detail in the following with reference to some embodiments given by way of example, and Figures. Shown are:

FIG. 1: the increase in weight of untreated R—SiC samples infiltrated with AlOOH-sol in cyclic oxidation test at 1400° C.;

FIG. 2: a reflected-light microscopic photograph of an untreated, non-oxidised R—Sic structure (enlarged 50 times);

FIG. 3: a view by reflected-light microscopy of an untreated R—SiC structure after 115 high-temperature cycles at 1400° C. (enlarged 50 times);

FIG. 4: a view by reflected-light microscopy of an untreated R—SiC structure infiltrated twice with AlOOH, after 185 high-temperature cycles at 1400° C. (enlarged 50 times);

FIG. 5: the increase in weight of untreated R—SiC samples infiltrated with AlOOH-sol in a cyclic oxidation test at 1550° C.;

FIG. 6: the increase in weight of untreated R—SiC samples infiltrated with $Zr(OH)_4$-sol in a cyclic oxidation test at 1700° C.;

FIG. 7: the increase in weight of untreated N—SiC and RBSN samples infiltrated with AlOOH-sol in a cyclic oxidation test at 1400° C.

There will firstly be described by way of example the manufacture of three sols, which can be used for infiltration within the framework of forming an anti-oxidation protective layer according to the invention.

1. Production of an AlOOH sol by hydrolysis of the alkoxide Al-(sec.)-butylate in water:

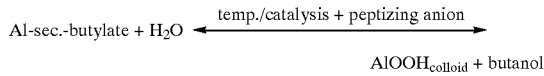

The catalyst required for hydrolysis, in the form of $HNO_3$ at the same time serves as a delivery agent for the peptizing anion for stabilising the AlOOH colloids, which form the actual sol in the excess water. During the hydrolysis reaction, the butanol evaporates off at about 80–90° C. After termination of the reaction there is for example present a colloidal sol with about 25% AlOOH, corresponding to 14.7% $Al_2O_3$.

2. Manufacture of an AlOOH-sol by dispersal of acidically peptized AlOOH particles, which have been produced by previous alkoxide hydrolysis reaction and dried:

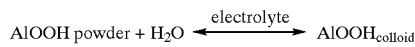

The AlOOH colloid powder dispersed in the excess water with e.g. $HNO_3$ as an electrolyte, can be present at a concentration of e.g. 28% AlOOH, corresponding to 16.5% $Al_2O_3$, as a colloidal sol.

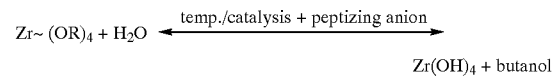

Additives are required for hydrolysis and peptizing, similar to the manufacture of AlOOH in the form e.g. of $HNO_3$. The $Zr(OH)_4$ colloids peptized in the excess water represent the actual sol.

The respective sols are set to a viscosity of about 10 to 300 mPas (measured at a shear gradient of 500 l/s). This can be effected by corresponding addition of electrolyte and/or the action of time and/or temperature which influence the kinetics of the gelation.

Infiltration of the open-pored ceramics via a vacuum vessel follows. For this purpose the components are placed in a vacuum chamber, a vacuum of about 100 mbar is generated in the chamber and then the sol is drawn into the vacuum chamber by the vacuum. The evacuated pore inner space of the ceramics is entirely filled by the sol. After ventilating the vacuum chamber, the infiltrated components are dried at 60–110° C. In order to ascertain the introduced quantity of $Al_2O_3$ or $ArO_2$ into the pore inner space, random samples are separated at about 500° C. in order entirely to drive out the chemically bound water.

The infiltration procedure can of course be repeated.

The cyclic high-temperature behaviour of the infiltrated R—SiC, N—SiC and RBSN ceramics was compared with those untreated ceramics, samples in parallel passing through a production furnace with an oxidising atmosphere at about 1400° C., 1500° C. and 1700° C. In comparison, the increases in weight after each cycle and the four-point bending strengths were measured with reference to random samples, and scanning electron and reflected-light microscopy was prepared on the basis of random samples.

Cyclic Oxidation Tests of R—SiC at 1400° C.

The R—SiC samples were infiltrated once, twice and three times with AlOOH-sol dispersed from colloidal AlOOH powder (AlOOH concentration 10%). After each infiltration the samples were dried at 110° C. and then at 500° C. The drying procedure at 500° C. served to determine the proportion of $Al_2O_3$ introduced into the pore space. The increases in weight at a single infiltration came to 0.45%, at double infiltration 0.95% and at triple infiltration 1.3%.

The components were exposed to multiple temperature cycles at 1400° C. and a holding time of 3.3 hours. FIG. 1 shows the respective oxidation configuration with reference to the measured increases in weight per high-temperature cycle and strengths measured on random samples. FIG. 2 shows the structure of the untreated sample before high-temperature treatment.

The strengths σ measured on random samples are compared in Table 1 also.

TABLE 1

Strength Comparisons after high-temperature cycles at 1400° C.

| Sample | No. Cycles | σ [Mpa] |
|---|---|---|
| untreated | 0 | 83.4 |
| untreated | 40 | 108.4 |
| untreated | 113 | 63.5 |
| untreated | 136 | 14.1 |
| $AlOOH_{14\%}$ infiltrated once | 150 | 100.6 |

TABLE 1-continued

Strength Comparisons after high-temperature cycles at 1400° C.

| Sample | No. Cycles | σ [Mpa] |
|---|---|---|
| AlOOH$_{14\%}$ infiltrated twice | 155 | 108.6 |
| AlOOH$_{14\%}$ infiltrated thrice | 190 | 105.7 |

The increases in weight and thus oxidation rates of the samples infiltrated with AlOOH-sol show in the course of increasing cycle numbers a much lower increase than the untreated samples. The typical turning point in the oxidation behaviour of the untreated R—SiC sample, which is connected with a drastic drop in strength (Table 1) and structural shattering (FIG. 3), initially does not appear in the infiltrated R—SiC samples. As FIG. 1 shows, no turning point in the oxidation configuration of the infiltrated samples can be recognised even after about 180 cycles, so that here there is at least a doubling in the life duration of the R—SiC in cyclic high-temperature use. Contrary to the treated R—SiC, after 185 temperature cycles (FIG. 4), the untreated R—SiC is no longer capable of bearing a load after 115 temperature cycles due to initial crack formation in the structure (FIG. 3), and must be exchanged as a supporting component.

Cyclic Oxidation Tests of S—SiC at 1550° C.

R—SiC samples were infiltrated once and twice with AlOOH-sol, manufactured from hydrolysed ASl-(sec.) butylate (AlOOH concentration 10%). The increases in weight after drying at 500° C. came to 0.45% at single infiltration and 0.95% at double AlOOH infiltration. The components were exposed to multiple temperature cycles at 1550° C. with a holding time of 8 hours. FIG. 5 shows a respective oxidation configuration with reference to the measured increases in weight per high-temperature cycle respectively for untreated, singly and doubly infiltrated samples.

The oxidation rates of the samples infiltrated with AlOOH-sol here also reveal in the course of increasing cycle numbers a similar behaviour to the oxidation tests in Example 1. The closed anti-oxidation layers of the infiltrated R—SiC pore surfaces are respectively compared to a fissured oxidation layer of the untreated R—SiC. The low increase in weight of the infiltrated components is due to the closed anti-oxidation layers on the pore surfaces, while the untreated samples have an intensely fissured oxide layer, which break up after the individual high-temperature cycles due to the differing heat expansion behaviour of SiC and $SiO_2$, and expose fresh SiC surfaces to unhindered oxidation. This typical break-up of the $SiO_2$ layer on the pore surface was suppressed by the in-situ reaction of the $Al_2O_3$ with $SiO_2$ to form mullite.

Cyclic Oxidation Tests of R—SiC at 1700° C.

R—SiC samples were singly and doubly infiltrated with $Zr(OH)_4$-sol. The $Zr(OH)_4$-sol was produced by hydrolysis of zirconium butylate. The $Zr(OH)_4$-concentration was 12%. the increases in weight after 500° C. were 0.65% for single infiltration and 1.4% for double infiltration.

The components were exposed to multiple temperature cycles at 1750° C. with a holding time of 8 hours. FIG. 6 shows the respective oxidation configuration with reference to the measured increases in weight per high-temperature cycle respectively for untreated, singly and doubly infiltrated samples. Similarly to Examples 1 and 2, the infiltrated R—SiC samples reveal a clearly flatter increase in weight growth during the oxidation cycles than the untreated sample. Similarly to the preceding Examples, with reference to the varying pore surface covering, it is seen that here also the untreated R—SiC pore surface has a typically fissured morphology. The R—SiC sample infiltrated with Zr(OH)4-sol compared therewith has reacted as a consequence of the in-situ reaction with the $SiO_2$ to produce $ZrSiO_4$ and has formed a closed anti-oxidation layer on the SiC.

Cyclic Oxidation of N—SiC and RBSN at 1400° C.

The N—SiC and RBSN samples were respectively singly infiltrated with an AlOOH-sol (at 10%). The increases in weight of the samples after drying at 500° C. were 0.77% for N—SiC and 1.34% for RBSN. The components were exposed to multiple temperature cycles at 1400° C. with a holding time of 3.3 hours. FIG. 7 shows a respective oxidation configuration with reference to the measured increase in weight per high-temperature cycle respectively for untreated and singly infiltrated samples. Here also the N—SiC and RBSN ceramics subsequently treated by sol infiltration reveal a clearly flatter rise in weight growth in the course of the oxidation cycles than the untreated samples. The basically higher oxidation rate of RBSN compared to N—SiC is caused by higher open initial porosity of the RBSN with about 25% by volume in comparison to about 15% by volume for N—SiC, and a finer structure build-up. The slower progress of oxidation is to be ascribed, in the sol-infiltrated N—SiC and RBSN, to a reduced oxidation of the $Si_3N_4$ bond matrix. The fine-pored $Si_3N_4$ matrix, after the first high-temperature oxidation cycles, forms a closed anti-oxidation layer over the entire component, which reduces the continuing oxidation in the component cross-sections.

What is claimed is:

1. A method of manufacturing an anti-oxidation system for a sintered, porous, SiC based or $Si_3N_4$ based ceramic, comprising the steps of:

infiltration of a sol containing at least one metal component into inner pore spaces of the sintered ceramic, wherein the sol is formed by dispersal of metal hydroxide powder and/or partly hydrated metal oxide powder in water;

conversion of the sol to a gel; and high-temperature treatment of the ceramic in an oxidizing atmosphere.

2. Method of manufacturing an anti-oxidation system according to claim 1, wherein recrystallised SiC (R—SiC), nitride-bound SiC (N—SiC), or reaction-bound $Si_3N_4$ (RBSN) is used as the ceramic.

3. Method of manufacturing an anti-oxidation system according to claim 1, wherein before the high-temperature treatment, a sol infiltration/gel formation cycle is repeated a multiple number of times.

4. Method of manufacturing an anti-oxidation system according to claim 1, wherein the sol is introduced into the inner pore spaces by a vacuum or a pressure infiltration method.

5. Method of manufacturing an anti-oxidation system according to claim 1, wherein the high-temperature treatment is carried out at a temperature between 1000° C. and 1700° C.

6. Method of manufacturing an anti-oxidation system according to claim 1, wherein the at least one metal component is present in the sol at a concentration of 3% to 30%.

7. Method of manufacturing an anti-oxidation system according to claim 1, wherein AlOOH, Zr(OH)$_4$, or mixtures thereof are used as metal components.

8. Method of manufacturing an anti-oxidation system according to claim 6,
wherein AlOOH, Zr(OH)$_4$, or mixtures thereof are used as metal components.

9. Method of manufacturing an anti-oxidation system according to claim 1,
wherein the sol is formed by hydrolysis of alkoxides.

10. Method of manufacturing an anti-oxidation system according to claim 7,
wherein the sol is formed by dispersal of metal hydroxide powder and/or partly hydrated metal oxide powder in water.

11. Method of manufacturing an anti-oxidation system according to claim 1,
wherein the gel is formed by polycondensation of the sol.

12. Method of manufacturing an anti-oxidation system according to claim 1,
wherein the conversion of the sol to the gel is influenced by the addition of electrolyte.

13. Method of manufacturing an anti-oxidation system according to claim 1,
wherein the conversion of the sol to the gel is influenced by the addition of electrolyte and a temperature treatment.

14. Method of manufacturing an anti-oxidation system according to claim 1,
wherein the conversion of the sol to the gel is influenced by a temperature treatment between 30° C. and 110° C. for a period of 30 minutes to 5 hours.

15. Method of manufacturing an anti-oxidation system according to claim 1,
wherein the gel is set at a viscosity between 10 and 300 mPas at a shear gradient of 500 1/s.

16. Method of manufacturing an anti-oxidation system according to claim 1,
wherein a crystalline or part-crystalline solid phase is formed.

17. Method of manufacturing an anti-oxidation system according to claim 7,
wherein a crystalline or part-crystalline solid phase is formed.

18. Method of manufacturing an anti-oxidation system according to claim 16,
wherein the crystalline or part-crystalline solid phase has a heat expansion coefficient between $4.0 \times 10^{-6}$ and $5.5 \times 10^{-6}$ K$^{-1}$ (RT-1000° C.).

19. Method of manufacturing an anti-oxidation system according to claim 1,
wherein a crystalline or part-crystalline solid phase of $3Al_2O_3 \times 2SiO_2$ and/or $ZrSiO_4$ is formed.

20. A method of manufacturing an anti-oxidation system for a sintered, porous, SiC based or Si$_3$N$_4$ based ceramic, comprising the steps of:
forming a sol by dispersal of metal hydroxide powder and/or partly hydrated metal oxide powder in water;
infiltration of the sol containing at least one metal component into inner pore spaces of the sintered ceramic;
conversion of the sol to a gel; and
high-temperature treatment of the ceramic in an oxidizing atmosphere, wherein the high-temperature treatment is carried out at a temperature between about 1400° C. and about 1700° C.

21. Method of manufacturing an anti-oxidation system according to claim 20,
wherein before the high-temperature treatment, a sol infiltration/gel formation cycle is repeated a multiple number of times.

22. Method of manufacturing an anti-oxidation system according to claim 20,
wherein AlOOH, Zr(OH)$_4$ or mixtures thereof are used as metal components.

23. Method of manufacturing an anti-oxidation system according to claim 20,
wherein the gel formation is influenced by a temperature treatment between 30° C. and 110° C. for a period of 30 minutes to 5 hours.

24. Method of manufacturing an anti-oxidation system according to claim 20,
wherein a crystalline or part-crystalline solid phase is formed.

25. Method of manufacturing an anti-oxidation system according to claim 24,
wherein the crystalline or part-crystalline solid phase has a heat expansion coefficient between $4.0 \times 10^{-6}$ and $5.5 \times 10^{-6}$ K$^{-1}$ (RT-1000° C.).

26. A method of manufacturing an anti-oxidation system for a sintered, porous, SiC based or Si$_3$N$_4$ based ceramic, comprising the steps of:
infiltration of a sol containing at least one metal component into inner pore spaces of the sintered ceramic, wherein the sol is formed by dispersal of metal hydroxide powder and/or partly hydrated metal oxide powder in water, wherein the sol is introduced into the inner pore spaces by a vacuum or a pressure infiltration method;
conversion of the sol to a gel; and
high-temperature treatment of the ceramic in an oxidizing atmosphere, wherein the high-temperature treatment is carried out at a temperature of about 1400° C. or higher.

* * * * *